H. J. B. GRARD.
MACHINE FOR MEASURING THE SURFACE OF SKINS AND OTHER MATERIALS.
APPLICATION FILED MAR. 17, 1915.
1,166,359.
Patented Dec. 28, 1915.
5 SHEETS—SHEET 1.
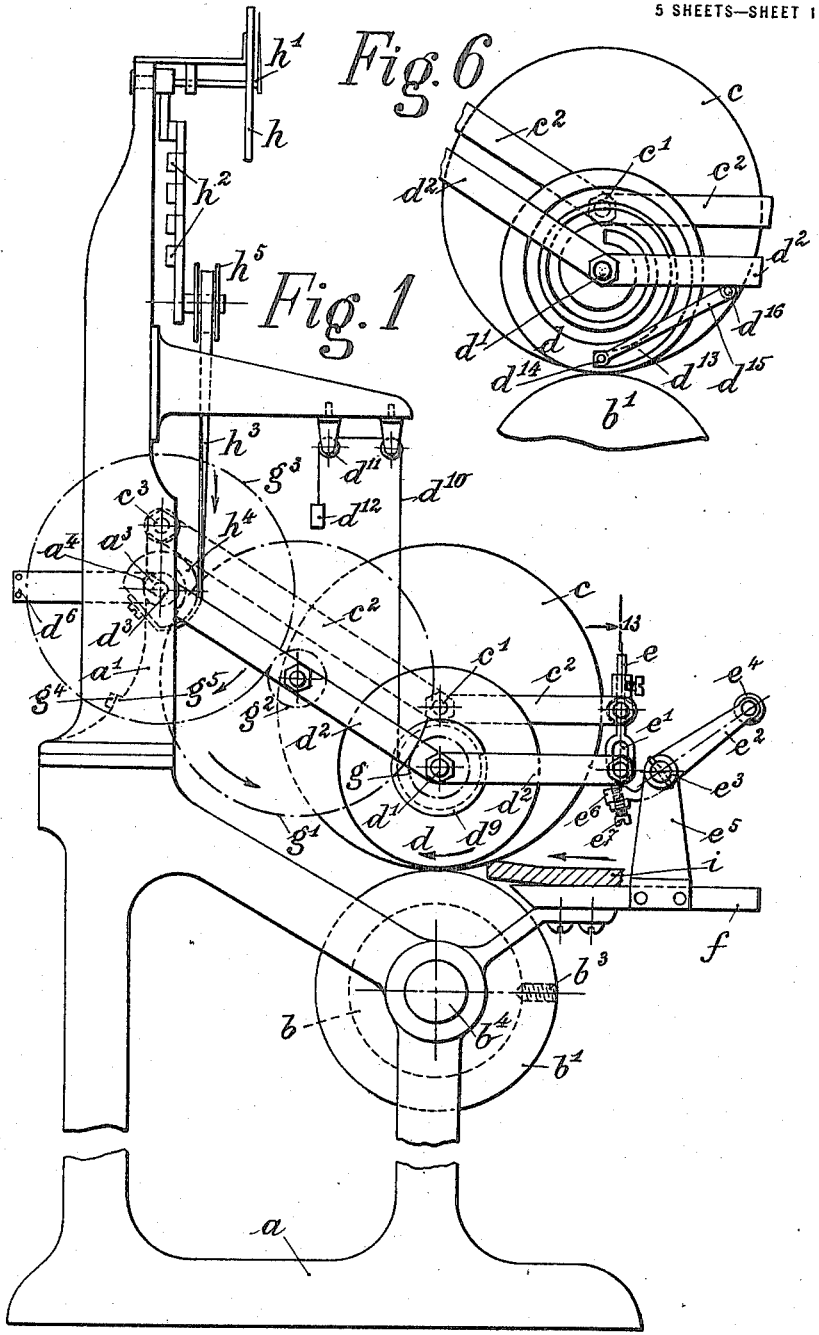
Inventor
Henri Jean Baptiste Grard
by Wilkinson, Ginsta & MacKaye
Attorneys.

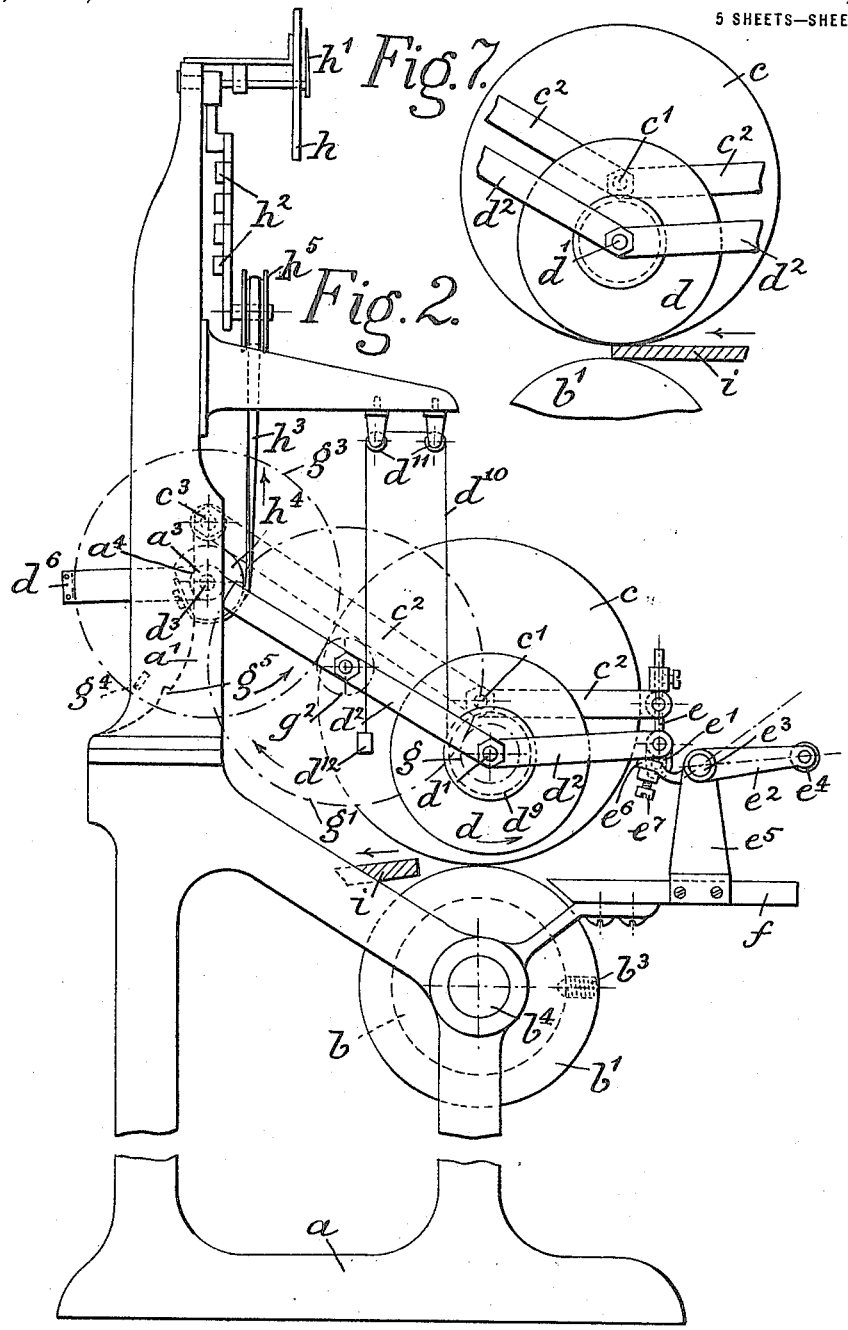

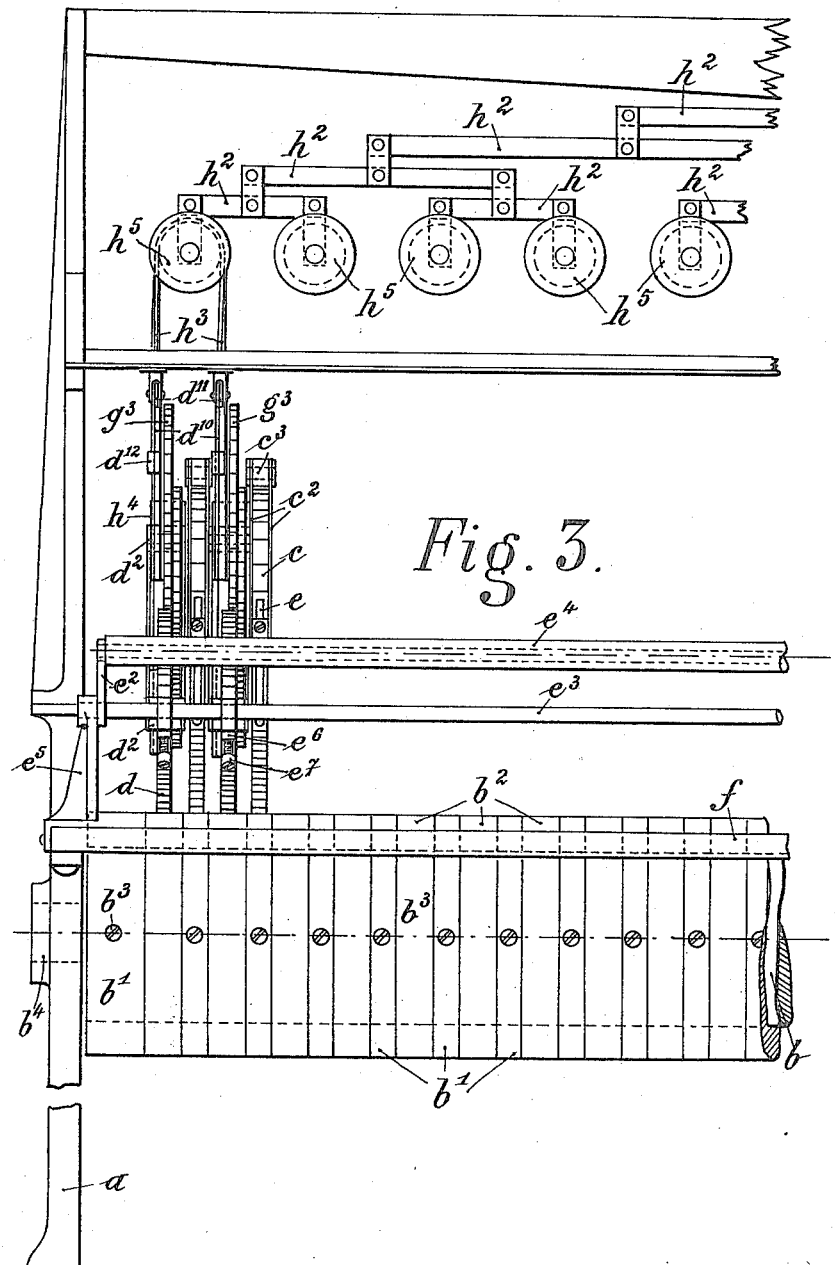

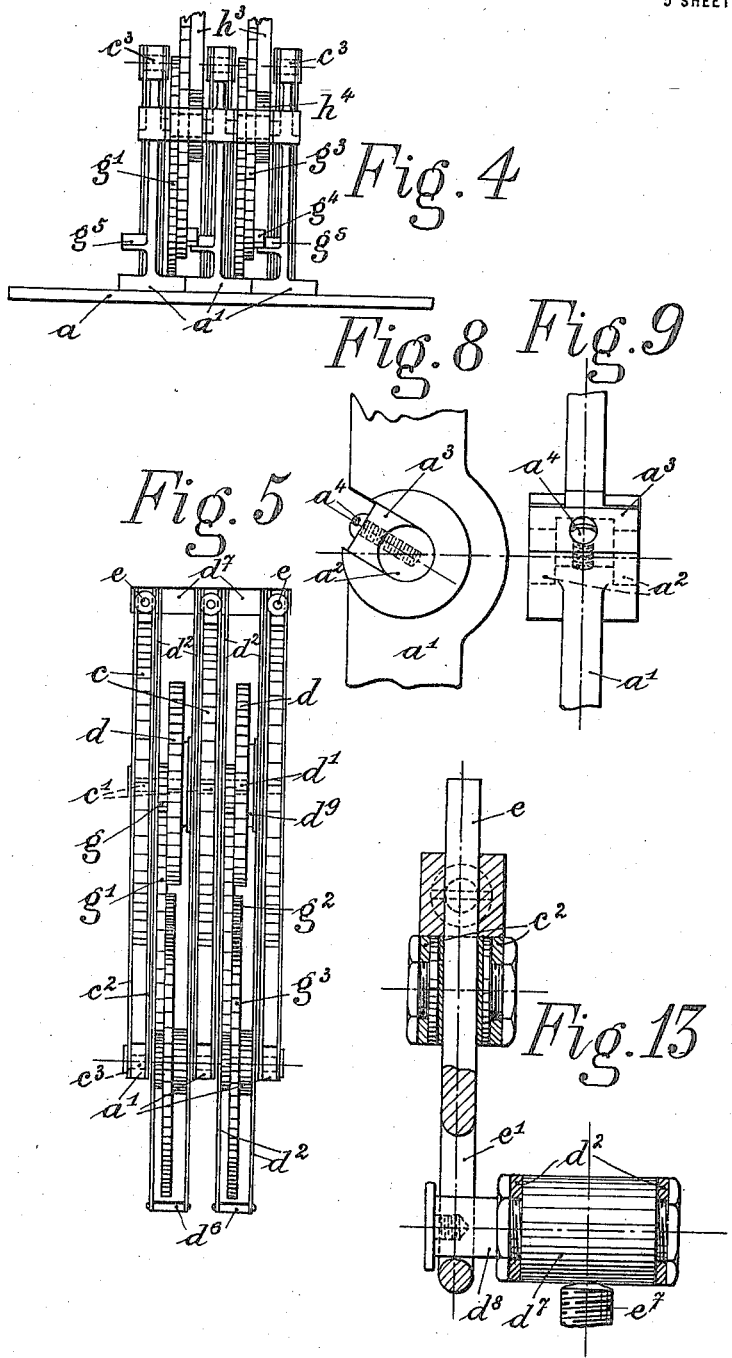

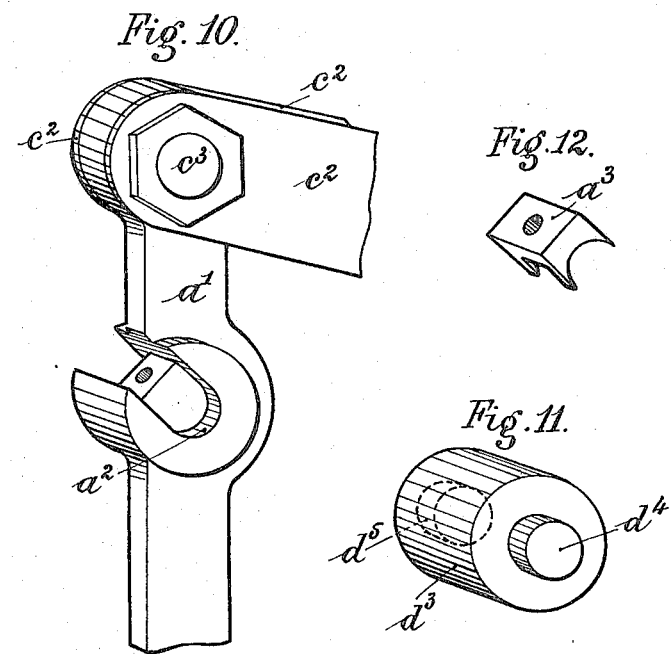

UNITED STATES PATENT OFFICE.

HENRI JEAN BAPTISTE GRARD, OF SOLRE-LE-CHATEAU, FRANCE.

MACHINE FOR MEASURING THE SURFACE OF SKINS AND OTHER MATERIALS.

1,166,359.  Specification of Letters Patent.  Patented Dec. 28, 1915.

Application filed March 17, 1915. Serial No. 14,952.

*To all whom it may concern:*

Be it known that I, HENRI JEAN BAPTISTE GRARD, manufacturer, a citizen of the Republic of France, and a resident of Solre-le-Chateau, Department Nord, France, have invented new and useful Improvements in Machines for Measuring the Surface of Skins and other Materials, of which the following is a specification.

The machine forming the subject of this invention is conceived in such a way that, firstly, it enables skins to be measured very accurately without the result obtained being influenced by differences in the thickness of the skins. Moreover, it does not in any way damage the skins, as is the case with certain existing machines. Again, its construction is such that the resetting to zero is rigorously accurate and is not influenced by wear of the working parts of the machine. Furthermore, the said machine presents the advantage that it does not, as do certain types, make the putting into operation of the measuring organs dependent on the thickness of the skin, which by raising the gear-wheels causes them to engage the measuring device. Finally, the constituent parts of the measuring device can be easily disassembled.

The principal characteristic of the present machine resides in that the members serving to feed the skin are distinct from those that serve to measure it, all these former coöperating with a driving drum, which acts upon the members for feeding the skin, but not upon the measuring organs.

A second characteristic resides in that the diameter of the feeding members is greater than that of the measuring members, for the purpose of causing measurement to begin and finish at one and the same fixed point, whatever may be the thickness of the skin to be measured.

A third characteristic resides in the provision of a device intended to do away with any possible lost motion between certain organs when resetting to zero, and thereby to obtain greater precision of measurement.

In the annexed drawings, which show a form of construction of the invention, Figure 1 is a side elevation, the organs occupying their initial position, before the introduction of a skin. Fig. 2 is a similar elevation, after the passage of a skin and during resetting to zero. Fig. 3 is a view of Fig. 1 looking from right to left; for the sake of simplicity only two measuring units have been shown. Fig. 4 is a view of part of Fig. 1 looking from left to right. Fig. 5 is a plan of Fig. 4. Fig. 6 shows a modification. Figs. 7 to 12 show details, the last five being on a larger scale. Fig. 13, on a larger scale, is a section on line 13 of Fig. 1.

Within the frame $a$ is mounted the driving drum $b$ comprising a set of rings $b'$ fixed to the drum $b$, and another set of rings $b^2$, loosely mounted on said drum. These rings have the same external diameter as the rings $b'$, so as to constitute with them a cylinder whose generatrix is rectilinear. The rings $b'$ are fixed by means of screws $b^3$ or in any other manner. The drum $b$ is provided with trunnions $b^4$ and is driven in any suitable manner, not shown.

The feeding members consist of wheels $c$ rolling upon the rings $b'$ and each mounted loosely upon a stud $c'$. Each of the studs $c'$ is mounted between two bent arms $c^2$, forming an element pivoting at $c^3$ on a standard $a'$ of the frame $a$.

The measuring organs consist of wheels $d$, resting on the loose rings $b^2$, and each mounted loosely upon a stud $d'$. Each of these studs $d'$ is mounted between two twice-bent arms $d^2$, forming an element which pivots at $d^3$ on trunnions $d^4$, $d^5$ (Fig. 11) mounted in recesses $a^2$ (Fig. 10) formed in each side of the standards $a'$. These trunnions are held in place by caps $a^3$ fixed by means of screws $a^4$ (Figs. 8 and 9) to the standards $a'$. It will be noticed that each of the caps $a^3$ retains, on one side the right-hand trunnion $d^4$ of one of the studs $d^3$, and on the other side the left-hand trunnion $d^5$ of the neighboring stud. The two arms $d^2$ of one and the same measuring wheel are connected at their extremities by stays $d^6$, $d^7$, Figs. 1, 2, 4, 5, 13.

At the end of each pair of arms $c^2$ is mounted an adjustable rod $e$, provided at its lower end with an eye $e'$ with which a trunnion $d^8$ of the stay $d^7$ engages. The object of this device is to permit of raising the measuring wheels $d$ (Fig. 2) so as to separate them from the rings $b^2$, without at the same time moving the feeding wheels $c$, which then remain in contact with their rings $b'$. This lifting is obtained by the intermediary of two levers $e^2$ mounted at each end of the machine on a shaft $e^3$ and connected by a bar $e^4$ which serves as a handle. The shaft $e^3$, which is mounted in brackets $e^5$ fixed to the work-table $f$, carries arms $e^6$ keyed thereon, whose number is equal to that of the measuring wheels $d$, two only being shown in Fig. 3. Each arm is provided with an adjustable abutment $e^7$ which bears against the stay $d^7$.

Between each pair of arms $d^2$ is fitted a train of gear-wheels, such as $g$, $g'$, $g^2$, $g^3$, which serves to transmit the movement of the corresponding measuring wheel $d$ to an adding mechanism of the Sawyer type, for example, which indicates in the known manner, the surface of each skin to be measured, on the dial $h$ by means of a pointer $h'$ (Figs. 1 and 2). Only a portion of the system of adding beams $h^2$ is shown. The movement imparted to the last wheel $g^3$ of the train is transmitted to the adding beams $h^2$ by the intermediary of the usual belts $h^3$, one end of which is fixed to a pulley $h^4$ fast on the wheel $g^3$, while the other extremity is fixed to a similar pulley $h^4$ of the neighboring wheel $g^3$. Each belt $h^3$ passes over a pulley $h^5$ fitted to the system of beams. A tappet $g^4$ is fitted on each wheel $g^3$ and abuts against an abutment $g^5$ provided on each standard $a'$ to stop the train of gears in its initial position shown in Fig. 1.

On a pulley $d^9$ fixed to each measuring wheel $d$ there is wound a cord $d^{10}$ passing over pulleys $d^{11}$ and carrying a counter-weight $d^{12}$, the arrangement being intended for automatically taking up the lost motion normally existing between the teeth of the different wheels of the train of gears, and to arrange said wheels, after resetting to zero, in such engagement that any movement of the measuring wheel $d$ is integrally transmitted according to the ratio of the wheels, to the wheel $d^3$, so that measurement is rigidly exact. In other words, the play which would otherwise be produced between the working faces of the teeth of different pairs of wheels which play results from the change in the direction of rotation of these wheels, is eliminated; in this way there is no lost movement at the beginning of each measuring operation.

The automatic taking up of the play indicated above can be effected by different means from that just described. These means, shown by way of example in Fig. 6, consist in doing away with the counter-weights $d^{12}$ and in transferring the abutment $g^4$, $g^5$ of the last wheels $g^3$ of the trains of gears to the measuring wheels $d$. On one of the faces of each of these wheels is formed a spiral groove $d^{13}$, in which there moves a roller $d^{14}$, mounted on an arm $d^{15}$ which pivots at $d^{16}$ on one of the arms $d^2$.

The machine operates as follows: Suppose the organs in the position shown in Fig. 1, in which the measuring wheels $d$ and feeding wheels $c$ are in contact with their respective rings $b'$, $b^2$, in which position consequently the trunnions $d^8$ (Fig. 13) rest on the bottom of the eyes $c'$ of the rods $c$. If a skin $i$, placed on the work-table $f$, is pushed toward the wheels $d$ and $c$, this skin first of all meets the whole of the rings $b'$, $b^2$ and then the wheels $c$. It is then drawn in automatically and raises these latter until they occupy the position shown in Fig. 7. In accordance, as these wheels rise, they take with them the measuring wheels $d$ through the intermediary of the arms $c^2$, rods $c$, trunnions $d^8$ and arms $d^2$. When all the wheels $c$, $d$ have been raised by the thickness of the skin $i$, and when this latter occupies the position just described, the said skin again comes into contact with the measuring wheels $d$ as soon as it has reached the line of their centers, and it is from this moment only that measuring begins. The skin then passing through the machine acts, by the intermediary of the measuring wheels $d$, which it encounters on the trains of gears $g$, $g'$, $g^2$, $g^3$, and on the corresponding belts $h^3$. The system of beams $h^2$ is thus influenced, and the surface of the skin is indicated by the pointer $h'$ on the dial $h$. During this measuring operation the pulleys $d^9$ having rotated, the cords $d^{10}$ have been unwound and the counter-weights $d^{12}$ have sunk, for example, to the position shown in Fig. 2. At the same time the tappet $g^4$ has left the abutment $g^5$, (Fig. 1) and has taken up the position shown, for example, in Fig. 2.

When the skin $i$ leaves the machine, the wheels $d$ cease to be actuated as soon as said skin has passed the line of their centers and measurement then stops, while the said skin continues to remain in contact during a very short time with the driving wheels $c$, these latter moving down, little by little until finally they rest on the whole of the rings $b'$ at the moment the skin has completely left the machine. The measuring wheels $d$ descend at the same time as do the feeding wheels $c$. The latter are moved by their rings and continue to rotate, while the others come to rest on their rings $b^2$ and remain stationary. The skin having passed through, its measurement is finished; the operator need then only read off the surface indicated by the pointer $h'$ on the dial $h$, after which he proceeds to reset the apparatus to zero. In order to reset to zero, he depresses the bar $e^4$ from the position shown in Fig. 1, to that shown in Fig. 2, the effect of which is to move the measuring wheels $d$ away from the rings $b^2$ and to interrupt their contact with these rings, as shown in this latter figure. The counter-weight, (not shown), of the adding mechanism then acts on the belts $h^3$, the effect of which is to turn the train of gears $g^3$, $g^2$, $g'$, $g$ in the direction of the arrows shown in Fig. 2 until the tappet $g^4$ comes into contact with the abutment $g^5$ (Fig. 1). Resetting to zero is then effected and it is sufficient for the operator to restore the handle $e^4$ to the position shown in Fig. 1, in order to bring the measuring wheels $d$ again into contact with their rings $b^2$ so as to be ready for a new operation. During the resetting to zero, the cord $d^{10}$ winds up on the pulley $d^9$ and raises the counter-weight $d^{12}$, which acts upon the train of gears $g$, $g'$, $g^2$, $g^3$ so as to keep the working faces of the teeth constantly in contact with each other and thereby render the measurements rigidly accurate.

Owing to the arrangement of the standards $a'$ and the manner in which the arms $c^2$, $d^2$ are fixed thereto, it will easily be understood that these latter can be disassembled without any difficulty.

I claim:—

1. A machine for measuring the surface of skins and similar materials, comprising a driving drum and feeding wheels engaging therewith for feeding the skins, a plurality of measuring wheels rotating between said feeding wheels and adapted to contact with the surface of the skin, means controlled by the feeding wheels for lifting the corresponding measuring wheels according to the thickness of the skin, adding mechanism, and means for transmitting the motion of said measuring wheels to said adding mechanism.

2. A machine of the character described, comprising a driving drum, a series of feeding wheels yieldingly mounted above said drum, a series of measuring wheels mounted between said feeding wheels, means for connecting the axes of adjacent pairs of feeding and measuring wheels whereby, when the skin is inserted, the feeding wheel lifts the adjacent measuring wheel corresponding to the thickness of the skin, adding mechanism, and means for transmitting the motion of said measuring wheels to said adding mechanism.

3. A machine of the character described, comprising a driving drum, a series of feeding wheels yieldingly mounted above said drum, a series of measuring wheels of lesser diameter than the feeding wheels mounted between said feeding wheels, means for connecting the axes of adjacent pairs of feeding and measuring wheels whereby, when the skin is inserted, the feeding wheel lifts the adjacent measuring wheel corresponding to the thickness of the skin, adding mechanism, and means for transmitting the motion of said measuring wheels to said adding mechanism.

4. A machine of the character described, comprising a driving drum, feeding wheels yieldingly mounted above said drum, measuring wheels mounted between said feeding wheels and adapted to make contact with the skin during the operation of the machine, means controlled by the yielding of said feeding wheels for raising said measuring wheels, adding and indicating mechanism, and means for transmitting the motion of the measuring wheels to said adding and indicating mechanism.

5. A machine of the character described, comprising means for feeding the skin, measuring wheels in contact during operation with the skin, means actuated by the feeding means for lifting said measuring wheels on contact of the feeding means with the skin, adding and indicating mechanism, and means for transmitting the motion of the measuring wheels to said adding and indicating mechanism.

6. A machine of the character described, comprising a driving drum, a plurality of feeding wheels adapted to engage said drum, a plurality of measuring wheels separate and distinct from and of smaller diameter than said feeding wheels and located between said feeding wheels, means controlled by the feeding wheels for lifting the corresponding measuring wheels according to the thickness of the skin, adding and indicating mechanism, and means for transmitting the motion of said measuring wheels to said adding and indicating mechanism.

7. A machine of the character described, comprising a driving drum, a set of rings loose on said drum, a set of rings fast on said drum, a plurality of feeding wheels yieldingly mounted above said drum and engaging the skin between them and the rings fast on the drum, a plurality of measuring wheels each located above a loose ring and contacting with the skin, means controlled by the lifting of said feeding wheels when the skin is fed to the machine for lifting the measuring wheels, adding and indicating mechanism, and means for transmitting the motion of the measuring wheels to said adding and indicating mechanism.

8. A machine of the character described, comprising a driving drum, a set of rings loose on said drum, a set of rings fast on said drum, a plurality of feeding wheels yieldingly mounted above said drum and engaging the skin between them and the rings fast on the drum, a plurality of measuring wheels each located above a loose ring, means controlled by the lifting of the feeding wheels incident to the insertion of the skin for raising the measuring wheels, adding and indicating mechanism, and means for transmitting the motion of the measuring wheels to said adding and indicating mechanism.

9. A machine of the character described, comprising a frame, a driving drum mounted in said frame, a set of loose rings on said drum, a set of rings fast on said drum, a plurality of feeding wheels engaging the skin between them and the rings fast on the drum, a series of arms pivoted to said frame and provided with studs carrying said feeding wheels, a second series of arms pivoted on said frame and carrying a second series of studs, a plurality of measuring wheels mounted on said last mentioned studs and each located above a loose ring, adding and indicating mechanism, and means for transmitting the motion of the measuring wheels to said adding and indicating mechanism.

10. A machine of the character described, comprising a frame, a driving drum mounted in said frame, a set of loose rings on said drum, a set of rings fast on said drum, a plurality of feeding wheels engaging the skin between them and the rings fast on the drum, a series of arms pivoted to said frame and provided with studs carrying said feeding wheels, a second series of arms pivoted on said frame and carrying a second series of studs, a plurality of measuring wheels mounted on said last mentioned studs and each located above a loose ring, the measuring wheels being of smaller diameter than the feeding wheels, means for connecting the arms supporting the feeding wheels with the arms supporting the measuring wheels whereby, when the feeding wheel is lifted by the insertion of the skin, the corresponding measuring wheel is lifted also, adding and indicating mechanism, and means for transmitting the motion of the measuring wheels to said adding and indicating mechanism.

11. A machine of the character described, comprising means for feeding the skin, a plurality of measuring wheels adapted to contact with the surface of the skin, adding and indicating mechanism, a train of gears for transmitting the motion of said measuring wheels to said adding and indicating mechanism, and automatic means for taking up play in said train of gears.

12. A machine of the class described, comprising means for feeding the skins, a plurality of measuring wheels adapted to contact with the surface of the skin, adding and indicating mechanism, a train of gears for transmitting the motion of said measuring wheels to said adding and indicating mechanism, and a loaded cord attached to one of said gears for the purpose of taking up the lost motion in said gears.

13. A machine of the class described, comprising a frame, a driving drum mounted in said frame, said drum having a number of fast and loose rings thereon, a plurality of pairs of arms pivoted on said frame, a stud carried by each of said pairs of arms, feeding wheels loosely mounted on said studs, each feeding wheel being opposite a fixed ring on said drum, a second set of pairs of arms pivoted on said frame, a stud carried by each of said pairs of arms, measuring wheels on said last mentioned studs, each measuring wheel being opposite a loose ring on said drum, adding and indicating mechanism, and gear wheels connecting each measuring wheel to said adding and indicating mechanism.

14. A machine of the class described, comprising a frame, a driving drum mounted in said frame, said drum having a number of fast and loose rings thereon, a plurality of pairs of arms pivoted on said frame, a stud carried by each of said pairs of arms, feeding wheels loosely mounted on said studs, each feeding wheel being opposite a fixed ring on said drum, a rod mounted at the end of each pair of arms, said rod having an eye at its lower end, a second set of pairs of arms pivoted to the frame, measuring wheels mounted in said pairs of arms, a trunnion projecting from each of said latter pairs of arms into the eye in said rod, a shaft arranged at right angles to said pairs of arms, levers fitted on said shaft and adjustably engaging said trunnions, means for rotating said shaft, adding and indicating mechanism, and means for transmitting the motion of said measuring wheels to said adding and indicating mechanism.

HENRI JEAN BAPTISTE GRARD.

Witnesses:
R. H. BRANDON,
TRACY LAY.

Copies of this patent may be obtained for five cents each, by addressing the "Commissioner of Patents Washington, D. C."